United States Patent
Wammes et al.

(10) Patent No.: US 7,026,385 B2
(45) Date of Patent: Apr. 11, 2006

(54) CLAY-CONTAINING MIXTURE OR BLEND CAPABLE OF FORMING A MOISTURE RESISTANT GEL, AND USE OF THAT MIXTURE AND BLEND

(75) Inventors: Jacobus Cornelis Wammes, Velddriel (NL); Oszkar Libor, Budapest (HU)

(73) Assignee: Trisoplast International B.V., Valddriel (NL)

( * ) Notice: Subject to any disclaimer, the term of this patent is extended or adjusted under 35 U.S.C. 154(b) by 354 days.

(21) Appl. No.: 10/239,049

(22) PCT Filed: Mar. 16, 2001

(86) PCT No.: PCT/NL01/00221

§ 371 (c)(1),
(2), (4) Date: Dec. 20, 2002

(87) PCT Pub. No.: WO01/70903

PCT Pub. Date: Sep. 27, 2001

(65) Prior Publication Data

US 2004/0097601 A1     May 20, 2004

(30) Foreign Application Priority Data

Mar. 20, 2000   (NL) ................................... 1014690

(51) Int. Cl.
  *B05D 1/00* (2006.01)
  *C08K 3/26* (2006.01)
  *C08K 3/32* (2006.01)
  *C08K 3/10* (2006.01)
  *C08K 3/12* (2006.01)

(52) U.S. Cl. .................... 524/446; 427/331; 524/414; 524/417; 524/424; 524/555

(58) Field of Classification Search ................ 524/446, 524/555

See application file for complete search history.

(56) References Cited

U.S. PATENT DOCUMENTS

| 4,128,528 | A | * | 12/1978 | Frisque et al. ............... 524/447 |
| 4,600,744 | A | * | 7/1986 | Libor et al. .................. 524/446 |
| 4,669,920 | A | * | 6/1987 | Dymond ...................... 405/264 |
| 5,112,391 | A | * | 5/1992 | Owen et al. ................... 75/772 |
| 5,571,314 | A | * | 11/1996 | Supcoe et al. .............. 523/175 |
| 5,604,168 | A | * | 2/1997 | Libor .......................... 516/103 |
| 6,340,385 | B1 | * | 1/2002 | Wammes ................ 106/287.17 |

FOREIGN PATENT DOCUMENTS

| EP | 172938 | A2 | * | 3/1986 |
| EP | 244981 | A | * | 11/1987 |
| EP | 0 335 653 | | | 10/1989 |
| EP | 682684 | A1 | * | 11/1995 |
| GB | 1439734 | A | * | 6/1976 |
| WO | 94 18284 | | | 8/1994 |
| WO | 99 11732 | | | 3/1999 |

* cited by examiner

Primary Examiner—Robert Sellers
(74) Attorney, Agent, or Firm—Oblon, Spivak, McClelland, Maier & Neustadt, P.C.

(57) ABSTRACT

The invention relates to a clay-containing mixture or blend capable of forming a moisture resistant gel, which comprises a powdered or ground smectite and/or a smectite-containing natural rock and at least 0.8–10% by weight, calculated for the smectite content, of an at least partially water-soluble and/or water swellable polymer and optionally at least 0.5% by weight of a solid activating agent. Such a mixture may also additionally comprise as a diluting agent more than 0.5% by weight of one or more solid inert filler(s); this diluted version is termed in the specification as a blend.

20 Claims, No Drawings

CLAY-CONTAINING MIXTURE OR BLEND CAPABLE OF FORMING A MOISTURE RESISTANT GEL, AND USE OF THAT MIXTURE AND BLEND

The invention relates to a clay-containing mixture or blend capable of forming a moisture resistant gel, which comprises a powdered or ground smectite and/or a smectite-containing natural rock and at least 0.8–10% by weight, calculated for the smectite content, of an at least partially water-soluble and/or water swellable polymer and optionally at least 0.5% by weight of a solid activating agent. Such a mixture may also additionally comprise as a diluting agent more than 0.5% by weight of one or more solid inert filler(s); this diluted version is termed in the specification as a blend.

It is well known that clay minerals of smectite type can be reacted, in the presence of water, with water-soluble and/or water swellable polymers to form moisture resistant gels. Such gels can be used to advantage for water insulation purposes, e.g. as soil sealants. Such gels will form when the following components are present simultaneously in the mixture, i.e. smectite, activating agent, polymer and water. After the formation of the gel it is very difficult to further manipulate the gel and therefore, according to the known methods of the prior art, a mixture having a long shell life is prepared by omitting one of the components, i.e. the activating agent (EP-A-0 335 653 filed in the name of the present inventor) or the water (WO 94/018284 and WO 99/11732 both in the name of the present inventor).

It is also known from European patent application 0 682 684, based on WO 94/18284, filed by the present inventor on Jan. 25, 1994, that activated smectites, i.e. smectites wherein at least 30% of the replaceable lattice ions are sodium and/or lithium ions, provide gels of superior structure and characteristics. Such activated smectites can either be obtained from their natural resources or can be prepared from inactive smectites by treating them with a source of sodium and/or lithium ions (this treatment is termed as activation). The dry mixtures according to EP-A-0 682 684 are difficult to compact and as a result the compacted layer has gaps and breaks through which water can escape very quickly, without contacting with the other active parts of the mixture or blend and thus without reacting. Activation can be performed either before or during or after reacting the smectite with the water-soluble and/or water swellable polymer.

A clay-containing mixture and the use thereof in gel formation is known from the afore mentioned EP-A-0 335 653. According to this reference a mixture comprising a smectite type clay mineral and at least 0.6% by weight of a water soluble polymer is intensely stirred or kneaded in the presence of at least 30% by weight of water to effect reaction between the clay mineral and the polymer. In this way an aqueous suspension of a clay mineral/polymer complex forms which is, optionally after a drying step, in a separate step reacted with at least 0.5% by weight of an activating agent under intense stirring or kneading in the presence of water. This latter reaction provides a gel capable of taking up and releasing water in a reversible manner. The latter step of adding the activation agent is performed at the site where the gel is to be used. A disadvantage of this method is that it requires cumbersome mechanical operations. Gel formation can be performed with a rather wide range of polymers, of which polyacrylamides, hydrolysed polyacrylamides and acrylic acid/acrylamide copolymers have also been mentioned without specifying them more accurately.

Although the method according to EP-A-0 335 653 leads to the formation of high quality gels applicable with good results for insulation purposes, this method has the disadvantage that the gel should always be preformed by a rather cumbersome mechanical operation. This operation is sometimes difficult to keep in hand and is rather energy-intensive because it requires an intense mixing and a long drying. These disadvantages render this method less attractive from economical points of view.

These disadvantages do not appear with those methods wherein a dry premixture for gel formation is prepared first from the gel-forming components excluding water, and this solid dry premixture is contacted with water only at the area to be treated. Such methods are disclosed in EP-A-0 244 981, GB 1 439 734 and EP-0 682 684, of which the latter stresses that the solid dry premixture should be protected from moisture during storage. The common disadvantage of these methods arises from the fact that a coherent gel free of gaps and breaks in continuity can only be formed from a well compacted dry premixture; dry powders and granules are, however, difficult to compact. Thus if they are to be used for soil sealing, which is their most frequent use, it is much more preferred to mix them with the soil (e.g by digging into soil) before wetting rather than to spread them simply on the soil surface either in dry state or as a slurry formed with water. This mixing operation requires specific equipment and manpower, which decreases the economy of the method.

Dry powders and granules can be prewetted to improve their compactibility. It should be, however, kept in mind that when a solid dry premixture for gel formation is wetted, gel-forming reactions start immediately. This occurs particularly with premixtures containing activated smectites, which react rather quickly with the polymers. A premature gel-formation which cannot be kept in hand is, however, highly undesirable from the aspects of processibility of the mixture and quality of sealing.

Now it has been found that if an appropriately selected water-soluble and/or water swellable polymer is used, a solid dry premixture for gel formation can be rendered water-tolerant. This means that the premixture for gel formation, comprising the specific polymer, may also comprise a limited amount of water without the risk of premature gel formation, and this low water content is sufficient to render the premixture well compactible. Compacting can be carried out by various technical methods such as compacting roller, vibrating plate or by the weight or compacting of an above layer or construction.

This means that the object of the present invention is to provide a gel-forming mixture suitable for storage, which mixture contains all of the reactants required for gel formation.

Another object of the present invention is to provide a gel-forming mixture which can be stored for a prolonged period of time without undergoing premature gel formation which cannot be controlled.

Thus the invention as disclosed in the preamble is according to the present invention characterised in that
said polymer is a linear chain acrylamide type (co)polymer with a molecular weight of at least 500,000, a hydrolysis degree of at most 30%, and a particle size of 2 μm to 1 mm, and
the mixture or blend also comprises 3–20% by weight of water, calculated for the total weight of the mixture or of the blend.

On basis of the present invention an aqueous mixture is obtained wherein a moderate pre-reaction between the activated smectite (or inactive smectite and activating agent) and the polymer takes place, which pre-reaction is insufficient for total gel formation. However, this pre-reaction is sufficient for creating some bonds between the polymer and the clay mineral, where upon the particles of the mixture or blend adhere better to one another. As a result a non-gelled mixture is formed which can be easily spreaded on the soil surface to be treated and can be easily compacted, leaving no gaps or breaks where the final gel forming water could escape.

The individual components of the mixture or blend according to the invention are discussed below in more detail.

As smectite e.g. montmorillonite, beidellite, hectorite, nontronite, saponite, illite, allevardite, mixtures thereof, natural rocks containing them (such as bentonite), or artificial mixtures of smectite-type silicates (e.g. LAPONITE® produced by Laporte Co., GB) can be applied. Smectite may be present either in activated or in inactive state or as a mixture of activated and inactive smectites. When all of the smectites present is inactive or the mixture of smectites present contains less than 30% by weight of activated smectite (calculated for the total weight of smectites present), the mixture or blend according to the invention must also contain at least 0.5% by weight of an activating agent. The upper limit of the activating agent is not too critical and depends mainly on the type of the inactive smectite present and on whether the mixture or blend also comprises some activated smectite or not. Generally, the amount of activating agent does not exceed 6% by weight. If all of the smectite present is inactive, the mixture or blend may contain preferably 3–5% by weight of activating agent. As activating agent any water-soluble sodium or lithium salt can be applied when the anion of which forms an insoluble precipitate with alkaline earth metals. Examples of such activating agents are sodium carbonate, lithium carbonate, sodium phosphates and polyphosphates, lithium phosphate and mixtures thereof, sodium carbonate being the most appropriate.

The particle size of the smectites and smectite-containing rocks is preferably below 100 µm. Smectites and smectite-containing rocks with an apparent viscosity of 3–30 cP at 20° C. and a Marsh funnel throughflow time of 25–40 sec, both measured on a 30–80 g/l aqueous suspension, are preferred.

The properties of the polymer are an important feature of the present invention and it should be taken into account that a moderate adhesive creating pre-reaction should proceed, where full or nearly full reaction leading to gel formation should by all means be avoided. Furthermore it should be taken into account that the mixture always contains a sufficient amount of intact polymer which gets available for further gel forming reactions only when the compacted layer is exposed to an additional amount of water. Thus both the solubility and the reactivity of the polymer should be adjusted so that these requirements are met.

The polymer present is a linear chain acrylamide type (co)polymer, which means that the (co)polymer chain is either fully linear or has only short side chains. The molecular weight of the (co)polymer is at least 500,000, preferably $1-8 \times 10^6$, more preferably $2-7 \times 10^6$. If the molecular weight is lower than 500,000, the polymer dissolves too easily which will lead to the formation of gel clusters which cannot be compacted, on the one hand, and to an insufficient amount of intact polymer "depot" for subsequent gel formation, on the other hand. The hydrolysis degree of the (co)polymer does not exceed 30%, preferable at most 15%, in particular 2–10%, which means that the (co)polymer may be either a non-hydrolysed polyacrylamide, or a weakly hydrolysed polyacrylamide or an acrylamide/acrylic acid copolymer which corresponds to a hydrolysis degree (percentage of $-CONH_2$ groups which have been hydrolysed to $-COOH$ and/or $-COO^-$) of not more than 15%. The hydrolysis degree of a hydrolysed polyacrylamide (or the $-COOH$ content of an equivalent acrylamide/acrylic acid copolymer) is preferably 2–10%. The hydrolysis degree of the polymer greatly influences the ratio of strong and weak adhesion—creating bonds. At a degree of hydrolysis over 30% strong adhesion creating bonds cannot be formed in the prereaction period in the required amount, which impairs the compactability of the mixture. These bounds are important in the prereaction period as well as in the after reaction period. The intrinsic viscosity of the (co)polymer is preferably 4–7 at 20° C.

The mixture or blend according to the invention may comprise as linear chain acrylamide type (co)polymer either a single (co)polymer or a mixture of two or more such (co)polymers. If desired, the mixture or blend according to the invention may also comprise one or more further (co)polymers which do not fall within the linear chain acrylamide type (co)polymers as defined above, provided that they have no adverse influence on the reaction between the linear chain acrylamide type (co)polymer and the smectite, and do not affect the water tolerance of the mixture or blend. Such additional (co)polymers, if present, may modify some characteristics of the gel formed from the mixture or blend according to the invention. Preferably a mixture of (co)polymers is used wherein the amount of said linear chain acrylamide type (co)polymer is ≧30% by weight, calculated for the total weight of the mixture of (co)polymers. A linear chain polymer in particulate form is partly capable of entering the crystal lattice of the clay mineral, whereupon the clay mineral adheres to the polymer. The other side of the polymer chain remains wounded and is able to react in later gel formation steps. A required degree of adhesion without premature gel formation can be achieved when at least a part of the reaction proceed inside the crystal lattice.

In addition, the particle size of the polymer according to the present invention should be between 2 µm and 1 mm. This particle size can be homogenized most easily with the other components of the mixture or blend and possesses the desired solubility for the prereaction step with the smectite. When the particle size is too small, swelling or dissolution will exceed the desired degree and the layer formed will not have the required quality. If the particle size is too high, it will restrict the swellability, and the required amount of adhesion creating bounds cannot be formed.

The blend according to the invention also contains one or more solid inert fillers. The amount of the filler may be up to 90% by weight, preferable 10–85% by weight, based on the weight of the blend. The average particle size of the solid filler is 0.05–8.0 mm, preferably 0.1–6.0 mm. The solid filler can be selected from sand, silicates, a ground rock or mineral, a ground fired ceramic or mixture thereof. It is also possible to use as the filler a ground industrial waste, whereby the waste can be recycled.

The mixture or blend according to the invention comprises beside the above components 3–20% by weight, preferably 5–15% by weight of water, too. These percentages are calculated for the total weight of the mixture or blend. This amount of water can be added to the mixture or blend either in a separate step, or the mixture or blend can be formed from components with appropriate moisture contents, or these methods can be used in combination. The mixture or blend can also adsorb and absorb the water amount after mixing process during different application processes. If the water content is too low, the mixture remains too dry, and compacting is difficult to perform. If the water content is too high, a premature gel formation occurs and no useful mixture can be obtained.

On the basis of the patents and patent applications cited above, the disclosure of which is incorporated herein by reference, it is very surprising that this water content does not affect the storability of the mixture or blend, and the mixture or blend is capable of forming a moisture resistant gel with excellent insulating properties even after a prolonged period of storage. Based on the above references and on other papers cited therein one had to expect that the water content of the mixture or blend will certainly initiate chemical reactions between the (co)polymer and the smectite (and the activating agent, if present), which would lead to uncontrollable premature gel formation processes, rendering thereby the mixture or blend either unprocessable in a subsequent seal-forming operation or unsuitable for producing a seal with reproducible characteristics.

The mixture or blend according to the invention can be prepared by simply homogenizing the individual constituents and, if required, adjusting the water content of the mixture or blend to the required value. The constituents can be introduced in any desired order, and homogenization can also be performed stepwise. Thus one can proceed by preparing the mixture first, which can be homogenized later with the fillers to form the blend. Preferably 1–9 times filler is used on 1 part mixture.

When used for water insulation purposes, the mixture or blend is simply applied onto the area to be treated. The water content of the mixture or blend assists its adherence to the object to be treated and renders the mixture or blend easily and well compactible, which is essential from the aspects of forming a continuous gel structure. Thereafter the mixture or blend is simply allowed to wet with water, where-upon a gel forms spontaneously. This wetting may also occur upon the effect of rainfall, percolated ground water, etc. For large scale insulation it is recommended to use the blend.

The mixture and blend according to the invention, and in particular the blend, can be used particularly for the following purposes:

water-tight insulation of basins, damps and other objects exposed to damaging effects of water or aqueous solutions;

insulation of waste stores;

cover layer of underground waste stores prior to recultivating their surface;

filling agent for cavities and cracks on walls, damps and other objects exposed to water or aqueous solutions, to stick the broken parts together; or between different open structured or water permeable natural or artificial produced layer(s), to form a vibration-balancing and insulating bed for railways, roads and other objects exposed to vibration damages.

The gel formed from the mixture or blend according to the invention has excellent and reversible water insulating properties. The heat and frost resistance of the gel is also excellent; its structure and insulating properties do not change within a temperature range of −25° C. and +60° C. The gel has buffering properties, too, thus it well tolerates the effects of aggressive liquids.

Further details of the invention are given in the following non-limiting Examples.

EXAMPLE 1

The following components were mixed in dry state:

150 kg of artificially activated ground bentonite with an average particle size of 100 μm (smectite content: 72% by weight, free sodium carbonate content: 3.5% by weight, both based on the weight of the bentonite), and 4.0 kg of polyacrylamide granules with a particle size of 0.2–80 μm (molecular weight: $6 \times 10^5$, degree of hydrolysis: 3%, intrinsic viscosity: 6).

900 kg of dry sand (particle size: 0.2–5.0 mm) were added to the homogeneous mixture under constant stirring. The resulting homogeneous blend was halved, and the water contents of the individual portions were adjusted to 5% and 12%, respectively.

The resulting blends with two different water contents were packed into air-and water-tight plastic bags as 20 kg portions, and the bags were stored at ambient temperature for 10 months. Thereafter samples were taken from the individual bags, and the permeabilities of the individual samples against tap water were measured by means of the falling head method according to Hoeks, J. et al. (Guidelines for the design of final landfill covers, Report 91, Staring Centre, Washington, 1990). In order to obtain comparable results care was taken that samples of the same water contents should be compacted practically to the same density (maximum permitted deviance: 1%). The following results were obtained: sample with 5% water content: 1.4 (±0.05)×$10^{-11}$ m/sec. at a density of 1580 kg/m³, sample with 12% water content: 2.1 (±0.05)×$10^{-11}$ m/sec. at a density of 1595 kg/m³.

EXAMPLE 2

The following components were homogenized in dry state:

100 g of inactive ground Ca-bentonite with a particle size below 100 μm (smectite content: 76% by weight), 3.2 g of powdered sodium carbonate, 1.5 g of polyacrylamide with a particle size in the range of 2 μm–0.5 mm (molecular weight: $5 \times 10^6$, degree of hydrolysis: 5%, intrinsic viscosity: 4.5), 0.2 g of cross-linked acrylamide/acrylic acid copolymer with a particle size in the range of 0.4 μm–0.2 mm (molecular weight: $1.0 \times 10^6$), and 0.5 g of nonionic polyacrylamide with a particle size in the range of 5 μm–0.8 mm (molecular weight: $2.5 \times 10^6$, non-hydrolysed, intrinsic viscosity: 2.5).

950 g of dry gravel with an average particle size of 6 mm were added to the above mixture under constant stirring, the mixture was homogenized, and the water content of the homogeneous mixture was adjusted to 14%.

The permeability of the resulting blend was measured against tap water according to the same method as disclosed in Example 1 and was found to be $3.7 \times 10^{-11}$ m/sec. at a density of 1550 kg/m³.

400 g of the resulting blend was weighted into an airtight vessel, and the vessel was maintained for 60 days in a thermostat heated to 85° C. After this ageing, which simulates storage for a period of about 1 year at 20° C., permeability was measured again as above, and was found to be $4.1 \times 10^{-11}$ m/sec. at a density of 1520 kg/m³.

These results illustrate that the blend according to the invention is easy to compact, and only insignificant changes occur in its compatibility and permeability upon ageing.

EXAMPLE 3

The following components were homogenized in dry state:
- 60 g of powdered moulding calcium bentonite with an average particle size of 80 µm (smectite content: 70% by weight, this smectite is of covered structure which is difficult to activate),
- 70 g highly swellable activated bentonite with a particle size below 90 µm (smectite content: 85% by weight),
- 1.4 g of an acrylamide/acrylic acid copolymer with a particle size in the range of 2 µm–1.0 mm (molecular weight: $5.5 \times 10^6$ acrylic acid content corresponding to a hydrolysis degree of 7%, intrinsic viscosity: 5), and
- 1.1 g of a polyacrylamide with a particle size in the range of 2 µm–0.8 mm (molecular weight: $3 \times 10^6$, hydrolysis degree: 0.5, intrinsic viscosity: 4.5).

1000 g of gravel with an average particle size of 6 mm and with a moisture content of 6.5% by weight were added to the above mixture under constant stirring. The water content of the resulting homogeneous blend was adjusted then to 10% by weight.

The permeability of the resulting blend was measured against an aggressive aqueous solution with a hardness of 250 NK° both in fresh state and after an ageing as described above. The following results were obtained: freshly prepared sample: $0.9 \times 10^{-11}$ m/sec. at a density of 1590 kg/m³, aged sample: $1.1 \times 10^{-11}$ m/sec. at a density of 1570 kg/m³.

COMPARATIVE EXAMPLE 1

The same compounds as used in Example 1 were homogenized in dry state, except that polyacrylamide granules with a particle size of 2 µm–1 mm (molecular weight: 400,000, degree of hydrolysis: 7%, intrinsic viscosity: 0.8) were mixed and adjusted to a water content of 12%. The permeability of the resulting blend against tap water was measured and was found to be much higher than the results obtained in Example 1.

COMPARATIVE EXAMPLE 2

The same compounds as used in Example 1 were homogenized, except that polyacrylamide granules with a particle size of 2 µm–0.5 mm, molecular weight: $4.5 \times 10^6$, degree of hydrolysis: 40%, intrinsic viscosity: 4, were mixed and adjusted to a water content of 10%. The permeability of the resulting blend against tap water was measured and was found to be much higher than the results obtained in Example 1.

COMPARATIVE EXAMPLE 3

The same compounds as used in Example 1 were homogenized, except that polyacrylamide granules with a particle size of 1.5 mm–2.3 mm, a molecular weight: $6 \times 10^6$, degree of hydrolysis: 4%, intrinsic viscosity: 5, were mixed and adjusted to a water content of 15%. The permeability of the resulting blend against tap water was measured and was found to be much higher than the results obtained in Example 1.

COMPARATIVE EXAMPLE 4

The same compounds as used in Example 1 were homogenized, except that the water contents of the resulting homogeneous blend was adjusted to 30%. Due to the high water content no useful blend was obtained.

COMPARATIVE EXAMPLE 5

The same compounds as used in Example 1 were homogenized, except that the water contents of the resulting homogeneous blend was adjusted to 1%. Due to the low water content no sufficient paste like mixture was obtained.

COMPARATIVE EXAMPLE 6

The same compounds as used in Example 1 were homogenized, except that the polyacrylamide granules with a particle size of 0.5–2 mm, a molecular weight: 400,000, degree of hydrolysis: 50%, intrinsic viscosity: 0.9, were mixed and adjusted to a water content of 16%. The permeability of the resulting blend against tap water was measured and was found to be much higher than the results obtained in Example 1.

The invention claimed is:

1. A clay-containing mixture which comprises a powdered or ground smectite, a smectite-containing natural rock or mixture thereof, wherein the smectite is present in an activated or an inactivated state, or in a mixture of said states,
   - 0.8–10% by weight of an at least partially water-soluble and/or water-swellable polymer,
   - and at least 0.5% by weight of a solid activating agent, except that the solid activating agent is only optionally present when activated smectite is present in an amount of at least 30% by weight based on the total weight of smectites present,
   - wherein the weight percentages are based on the weight of the smectite,
   - the mixture further comprising 3–20% by weight of water based on the total weight of the mixture,
   - wherein said polymer is a linear chain acrylamide (co)polymer with a molecular weight of at least 500,000, a hydrolysis degree of at most 30% and a particle size of 2 µm to 1 mm,
   - and wherein the clay-containing mixture is in a non-gelled form.

2. The mixture according to claim 1, wherein the polymer comprises a mixture of (co)polymers and wherein the amount of said linear chain acrylamide (co)polymer is ≧30% by weight, calculated for the total weight of the mixture of (co)polymers.

3. The mixture as claimed in claim 1, wherein the molecular weight of the polymer is $1–8 \times 10^6$.

4. The mixture as claimed in claim 3, wherein the molecular weight of the polymer is $2–7 \times 10^6$.

5. The mixture as claimed in claim 1, wherein the hydrolysis degree of the polymer is 2–10%.

6. The mixture as claimed in claim 1, wherein the intrinsic viscosity of the polymer is 4–7.

7. The mixture as claimed in claim 1, wherein water content of the mixture is 5–15% by weight, calculated for the total weight of the mixture.

8. A method comprising:
   applying the mixture of claim 1 to a surface exposed to water to protect the surface.

9. A method comprising:
   filling a crack or a crevice in an article exposed to water with the mixture of claim 1.

10. A method comprising:
sealing a surface by applying the mixture of claim 1 to the surface.

11. A clay-containing blend which comprises a powdered or ground smectite, a smectite-containing natural rock or mixture thereof, wherein the smectite is present in an activated or an inactivated state, or in a mixture of said states,
   0.8–10% by weight of an at least partially water-soluble and/or water-swellable polymer,
   more than 0.5% by weight of one or more solid inert fillers
   and at least 0.5% by weight of a solid activating agent, except that the solid activating agent is only optionally present when activated smectite is present in an amount of at least 30% by weight based on the total weight of smectites present,
   the blend further comprising 3–20% by weight of water based on the total weight of the blend,
   wherein said polymer is a linear chain acrylamide (co)polymer with a molecular weight of at least 500,000, a hydrolysis degree of at most 30%, and a particle size of 2 µm to 1 mm,
   and wherein the clay-containing blend is in a non-gelled form.

12. The blend according to claim 11, wherein the polymer comprises a mixture of (co)polymers and wherein the amount of said linear chain acrylamide (co)polymer is $\geq 30\%$ by weight calculated for the total weight of the mixture of (co)polymers.

13. The blend as claimed in claim 11, wherein the molecular weight of the polymer is $1-8 \times 10^6$.

14. The blend as claimed in claim 13, wherein the molecular weight of the polymer is $2-7 \times 10^6$.

15. The blend as claimed in claim 11, wherein the hydrolysis degree of the polymer is 2–10%.

16. The blend as claimed in claim 11, wherein the intrinsic viscosity of the polymer is 4–7.

17. The blend as claimed in claim 11, wherein water content of the blend is 5–15% by weight, calculated for the total weight of the blend.

18. A method comprising:
applying the blend of claim 11 to a surface exposed to water to protect the surface.

19. A method comprising:
filling a crack or a crevice in an article exposed to water with the blend of claim 11.

20. A method comprising:
sealing a surface by applying the blend of claim 11 to the surface.

* * * * *